US 6,732,474 B1

(12) United States Patent
Eck et al.

(10) Patent No.: US 6,732,474 B1
(45) Date of Patent: May 11, 2004

(54) VEHICLE DOOR AND METHOD OF ASSEMBLY

(75) Inventors: Helmut Eck, Rutesheim (DE); Harald Gerber, Wahlheim (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 09/693,905

(22) Filed: Oct. 23, 2000

(30) Foreign Application Priority Data

Oct. 21, 1999 (DE) .......................................... 199 50 656

(51) Int. Cl.$^7$ ................................................. B60J 5/04
(52) U.S. Cl. ......................................................... 49/502
(58) Field of Search ......................... 49/502; 296/146.5, 296/146.6

(56) References Cited

U.S. PATENT DOCUMENTS

| 4,648,208 A | | 3/1987 | Baldamus |
| 5,927,021 A | | 7/1999 | Kowalski et al. |
| 6,119,407 A | * | 9/2000 | Staser et al. .................. 49/502 |
| 6,139,088 A | * | 10/2000 | Okamoto et al. ............. 49/502 |
| 6,176,542 B1 | * | 1/2001 | Gooding et al. .............. 49/502 |
| 6,302,473 B1 | * | 10/2001 | Weber .......................... 49/502 |

FOREIGN PATENT DOCUMENTS

| DE | 44 30 862 | 3/1995 |
| DE | 19511105 | 11/1996 |
| EP | 0420617 | 9/1989 |
| EP | 0811516 | 5/1997 |

* cited by examiner

Primary Examiner—Jerry Redman
(74) Attorney, Agent, or Firm—Crowell & Moring LLP (57) ABSTRACT

A motor vehicle door in framework construction and method of making same is provided which includes a lower door element and a supporting doorframe made of profiles. The supporting doorframe essentially includes an upper window frame, an approximately horizontally aligned frame section running at the height of the window sill, and a lower frame. In order to combine numerous functional elements with the supporting doorframe into a prefabricated modular unit while increasing the stiffness of the motor vehicle door, particularly below the window sill, the region of the supporting doorframe lying below the window sill is provided with a large surface mounting support metal sheet which accommodates functional elements. The support metal sheet which is attached on one side at least with the approximately horizontally aligned frame section of the supporting doorframe and is attached on the other side overlapping with the lower door element to the lower frame and/or the lower door element.

15 Claims, 8 Drawing Sheets

VEHICLE DOOR AND METHOD OF ASSEMBLY

BACKGROUND OF THE INVENTION

This application claims the priority of German Patent Document 199 506 656.6, filed Oct. 21, 1999, the disclosure of which is expressly incorporated by reference herein.

The invention relates to a vehicle door, particularly a motor Do vehicle door in framework construction.

A motor vehicle door in framework construction is known from German Patent Document DE 44 30 862 A1 which consists of a lower door element and a supporting doorframe formed of hollow sections, whereby the supporting doorframe joins an upper window frame, a horizontally aligned frame section running approximately at the height of the window sill, and a lower frame. In this design, only the window opener for adjustment of the window pane is attached to the prefabricated supporting doorframe. Further functional elements such as loudspeakers, a door lock, a door control mechanism, a main door seal, or similar items cannot be attached to the supporting doorframe with this design.

SUMMARY OF THE INVENTION

An objective of the invention is to develop a motor vehicle door in framework construction in such a way that, while increasing the stiffness of the motor vehicle door, numerous functional elements can be combined with the supporting doorframe into a prefabricated modular unit, particularly below the window sill.

This is done by providing a large surface mounting support metal sheet in a region below the window's sill which accommodates functional elements. The mounting support metal sheet is attached overlapping with the lower door element on one side at least to the approximate horizontal aligned frame seat, and on another side to at least the lower frame and/or the lower door element.

Principal advantages attained with the invention are that by attaching a large surface mounting support metal sheet to the supporting doorframe, numerous functional elements can be connected simply and in an easily accessible way to the supporting doorframe. Thus, a loudspeaker, particularly a woofer, a window opener motor, a door control mechanism, a door lock, and door opening and closing aids can easily be premounted on the mounting support metal sheet. The motor vehicle door below the door parapet is significantly stiffened by the large surface mounting support metal sheet and its peripheral attachment to the lower door element. Furthermore, with this type of mounting support metal sheet, the main door seal can be positioned on the door side, above the window sill on the window frame of the supporting doorframe and below the window sill on a continuous peripheral recess of the mounting support metal sheet. Furthermore, the mounting support metal sheet provides a clear separation between wet and dry regions. The window opener motor, the door control mechanism, and the main cable loom are in the dry region.

The mounting support metal sheet can be quickly and easily demounted for maintenance purposes, in order to allow disassembly of the door lock, the window panes, and similar items.

An exemplary embodiment of the invention is shown in the drawings and will be described in more detail in the following.

Other objects, advantages and novel features of the present invention will become apparent from the following detailed description of the invention when considered in conjunction with the accompanying drawings.

DETAILED DESCRIPTION OF THE INVENTION

Figure 1:
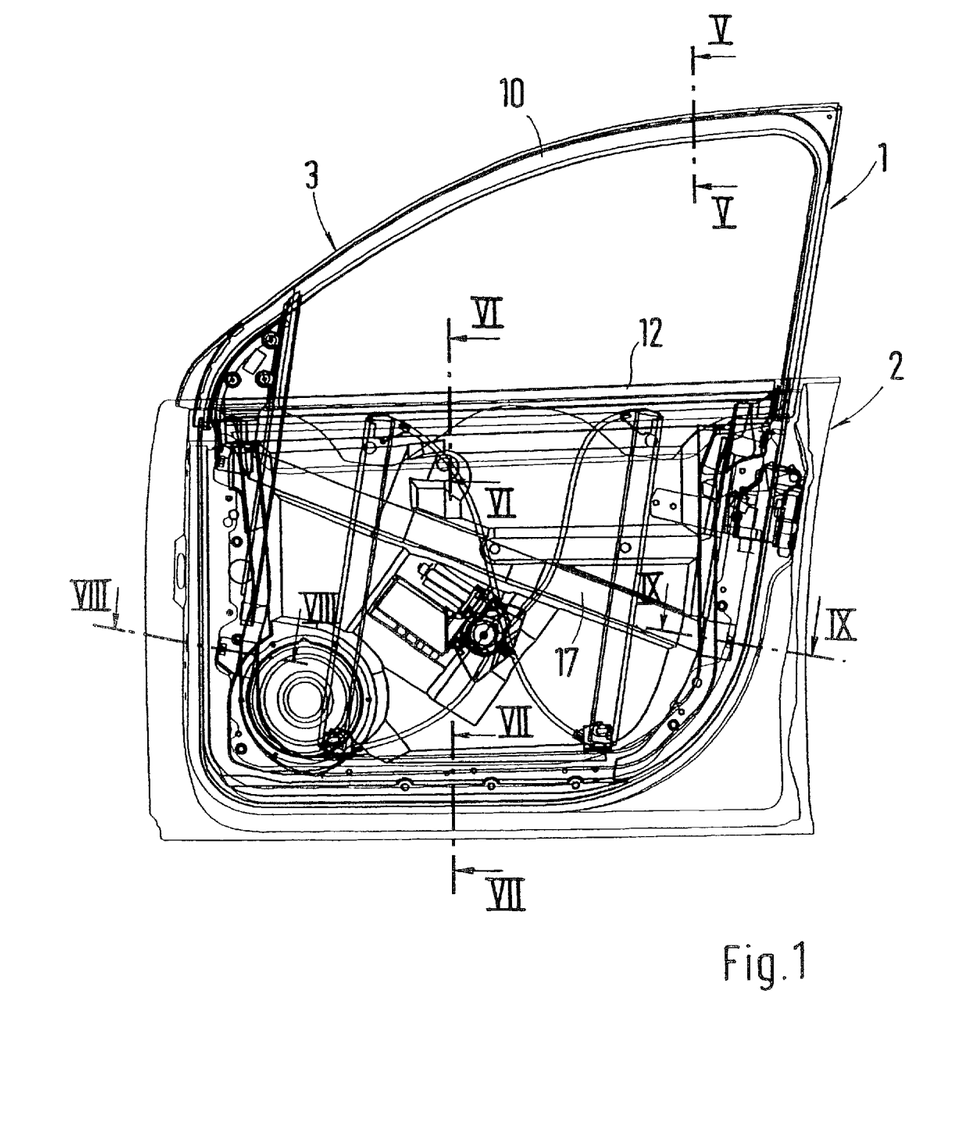
FIG. 1 is a side view of a motor vehicle door.
Figure 2:
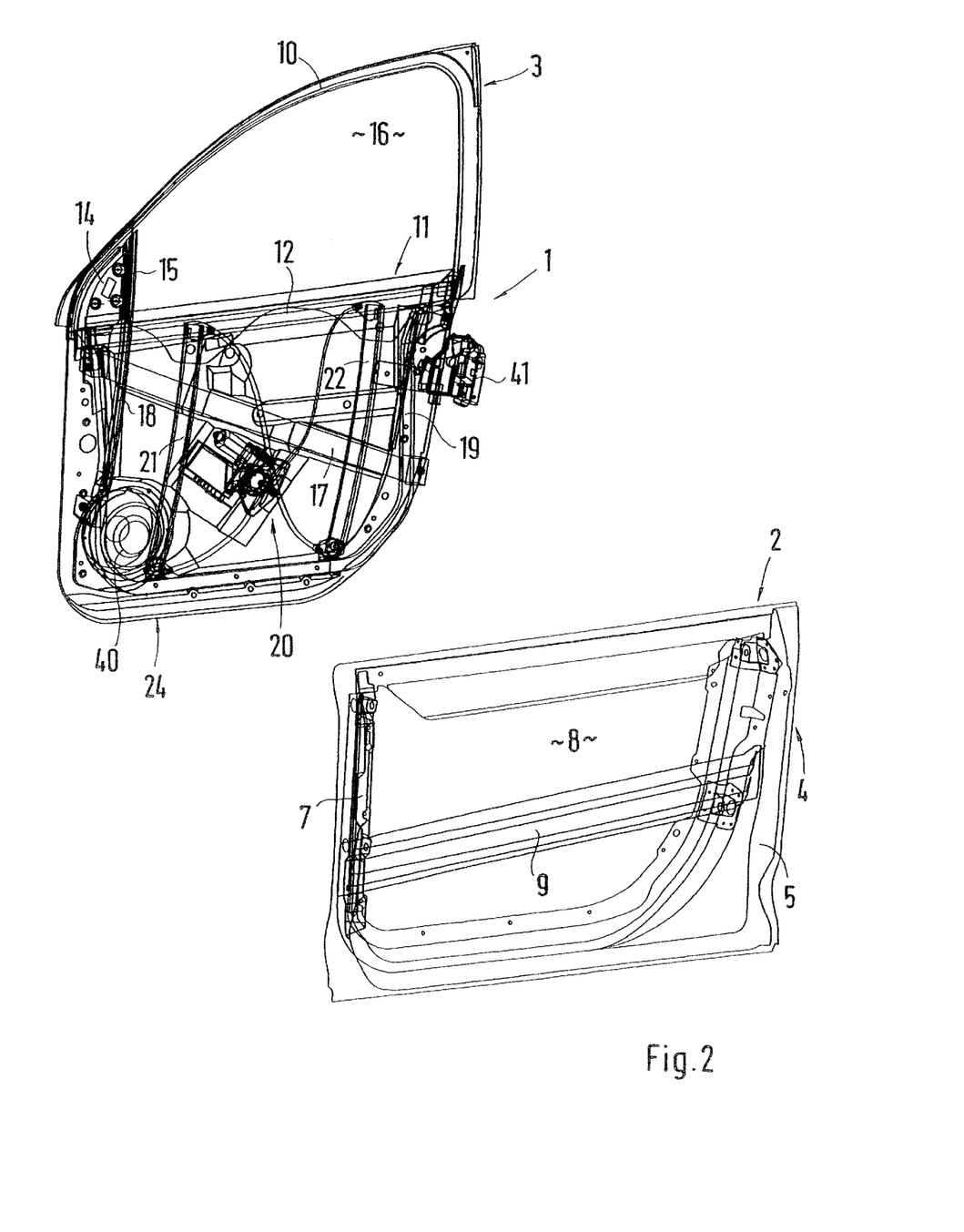
FIG. 2 is a schematic depiction of the lower door element and the supporting doorframe before assembly.

A motor vehicle door 1 manufactured in framework construction comprises a lower door element 2 in, for example, the form of a door casing and, furthermore, a supporting doorframe 3 assembled from profiles or sectional parts as shown in FIGS. 1 and 2.

Figure 4:
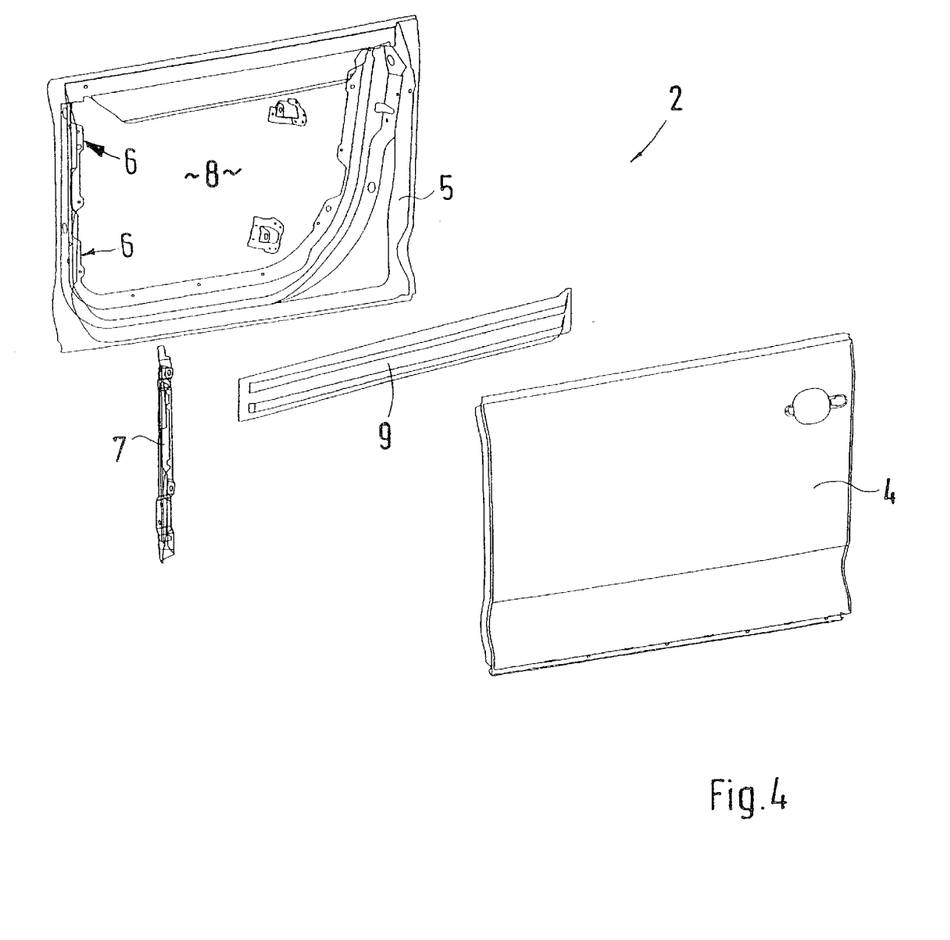
FIG. 4 is the parts of the lower door element in exploded view.

The lower door element 2 includes, in accordance with FIG. 4, a shell 4 and an internal frame section 5. The door element 2 is provided with an upright internal hinge reinforcement 7 in the region of the hinges 6. Furthermore, a contoured elongated impact bar 9, adjacent on both ends to the internal frame section 5 and attached to same, is provided in a hollow space 8 of the lower door element 2. The frame section 5 is formed by sheet steel stamping.

Figure 3:
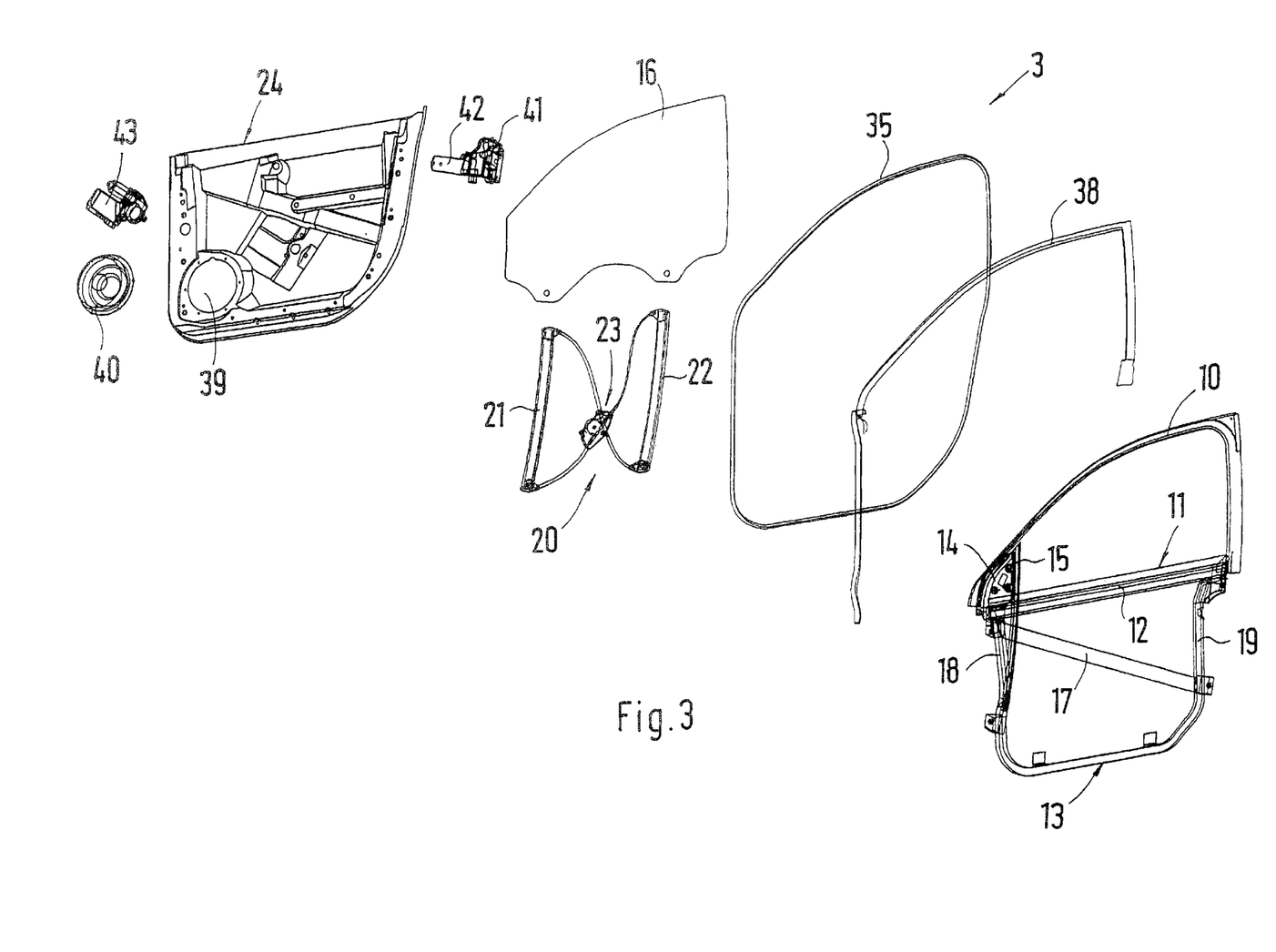
FIG. 3 is a schematic depiction of the essential parts of the supporting doorframe, the large surface mounting support metal sheet, and the functional elements accommodated in the doorframe and/or on the mounting support metal sheet.

The supporting doorframe 3, in accordance with FIG. 3, composed of sections comprises an upper curved window frame 10, an approximately horizontally aligned frame section 12 running at the height of the window sill 11, and an approximately U-shaped lower frame 13.

Furthermore, the doorframe 3 encloses an upright frame section 15 bordering a triangular side mirror 14 in the vertical direction, which also serves to guide a door window pane 16. The frame section 15 is attached to the upper window frame 10 and the lower frame 13. In addition, the doorframe 3 can be provided with a diagonal brace 17 for stiffening attached to both upright limbs 18, 19 of the lower frame 13. All of the parts of the supporting doorframe 3 are formed in the exemplary embodiment by extruded section parts made of a light metal alloy, whereby the extruded profile parts preferably have at least one closed hollow section.

The individual parts of the supporting doorframe 3 may be attached to one another with MIG welds.

A window opener 20 with opener guide rails 21, 22 as well as a drive 23 for adjusting the height of the door window pane 16 is provided below the upper window frame 10 and/or the horizontally aligned frame section 12. In a preferred embodiment, the window opener 20 is a cable window opener.

The two window guide rails 21, 22 are attached at their upper ends to the horizontally aligned frame section 12 and at their lower ends to the lower frame 13 and/or clamps positioned on same.

Figure 6:
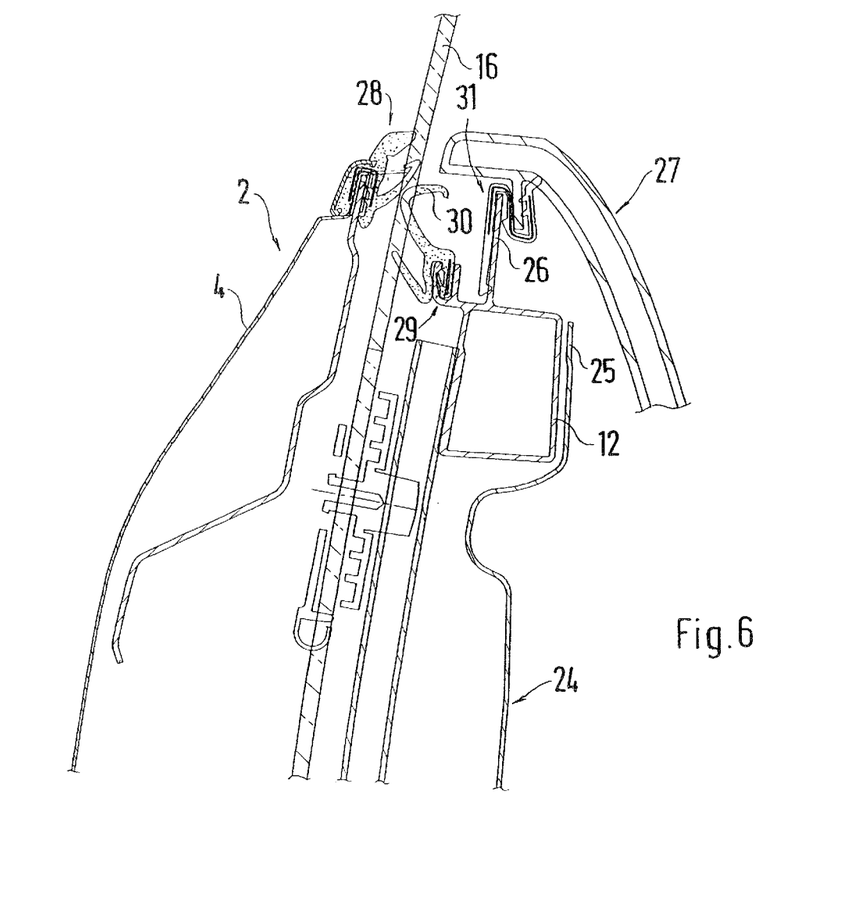
FIG. 6 a section along the line VI—VI of FIG. 1 in an enlarged view.

According to the invention, the region of the supporting doorframe 3 lying below the window sill 11 is provided with a large surface mounting support metal sheet 24 which accommodates functional elements and which is locally attached in the upper edge region to the approximately horizontally aligned frame section 12 of the supporting doorframe 3 by screws, welds, rivets, or similar means. An upper end region 25 of the mounting support metal sheet 24 is brought close to an upright flange of the frame section 12 for this purpose (FIG. 6). The mounting support metal sheet 24 is provided on the side of the motor vehicle door 1 towards the internal door covering 27.

Figure 7:
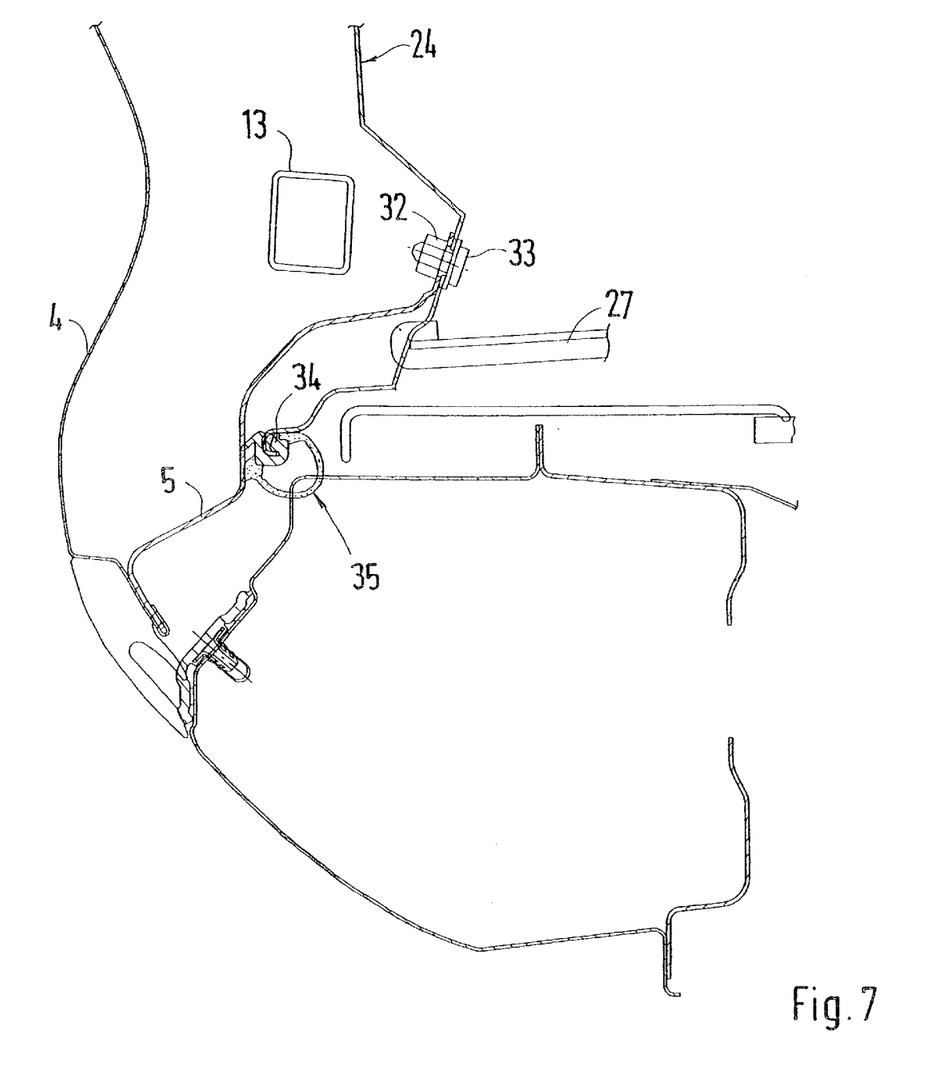
FIG. 7 is a section along the line VII—VII of FIG. 1 in an enlarged view.

An external door shaft seal 28 is positioned on the upper edge of the lower door element 2, while a tailored U-shaped acceptor recess 29 for an inner door shaft seal 30 is formed on the frame section 12. A support profile 31 for attachment of the internal door covering 27 is attached to a tailored ridge 26 of the frame section 12. In its forward, rear, and lower regions, the mounting support metal sheet 24 overlaps the lower frame 13 and/or the lower door element 2, whereby the mounting support frame 24 is removably attached to the door element 2 in these regions. Localized threaded bushings 32, nuts, or similar items are provided on the internal frame section 5 of the lower door element 2 for this purpose, into which attachment screws for attachment of the mounting support metal sheet 24 can be screwed (FIG. 7).

With the exception of the upper horizontally aligned edge, a continuous profiled recess 34 is formed on the edge of the mounting support metal sheet 24 which accommodates the main door seal 35 below the window sill 11.

An attachment section of the main door seal 35 is inserted in the U-shaped recess 34 and/or encompasses the edge region of the mounting support metal sheet 24.

Figure 5:
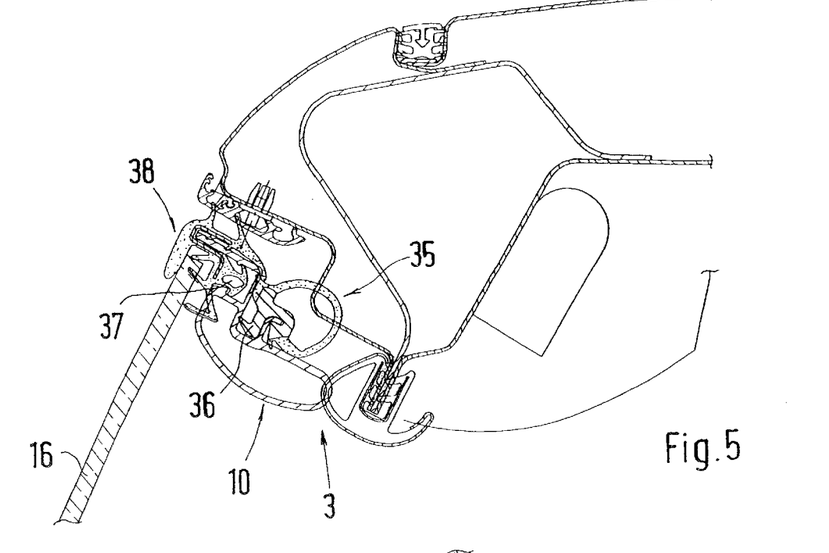
FIG. 5 is a section along the line V—V of FIG. 1 in an enlarged view.

Above the window sill 11, the main door seal 35 is accommodated in a corresponding recess 36 of the upper window frame 10 of the supporting doorframe 3 (FIG. 5).

The main door seal 35 is thereby completely positioned on the motor vehicle door 1 and has a continuous profile throughout without expensive injection molded parts.

Furthermore, another recess 37 is formed on the upper window frame 10 of the supporting doorframe 3, accommodating the outer door seal 38 which works together with the door window pane 16.

The large surface mounting support metal sheet 24, which is shaped like a baking sheet, has an acceptor opening 39 for a loudspeaker 40 in the lower forward peripheral region, whereby in the exemplary embodiment a woofer is inserted in the acceptor opening 39. A door lock 41 is premounted via a support angle 42 on the rear upper edge region of the mounting support metal sheet 24.

Furthermore, a window opener motor 43 of the window opener 20 is attached with screws on the mounting support metal sheet 24.

In addition, door opening and/or door closing aids and/or a door control mechanism and/or a main cable loom could be attached to the mounting support metal sheet 24 in a way which is not described in more detail.

The mounting support metal sheet 24 can be demounted with the supporting doorframe 3 attached and contributes significantly to the stiffening of the motor vehicle door 1.

In addition, the motor vehicle door 1 is divided into a wet region and a dry region by the large surface mounting support metal sheet 24.

Figure 8:
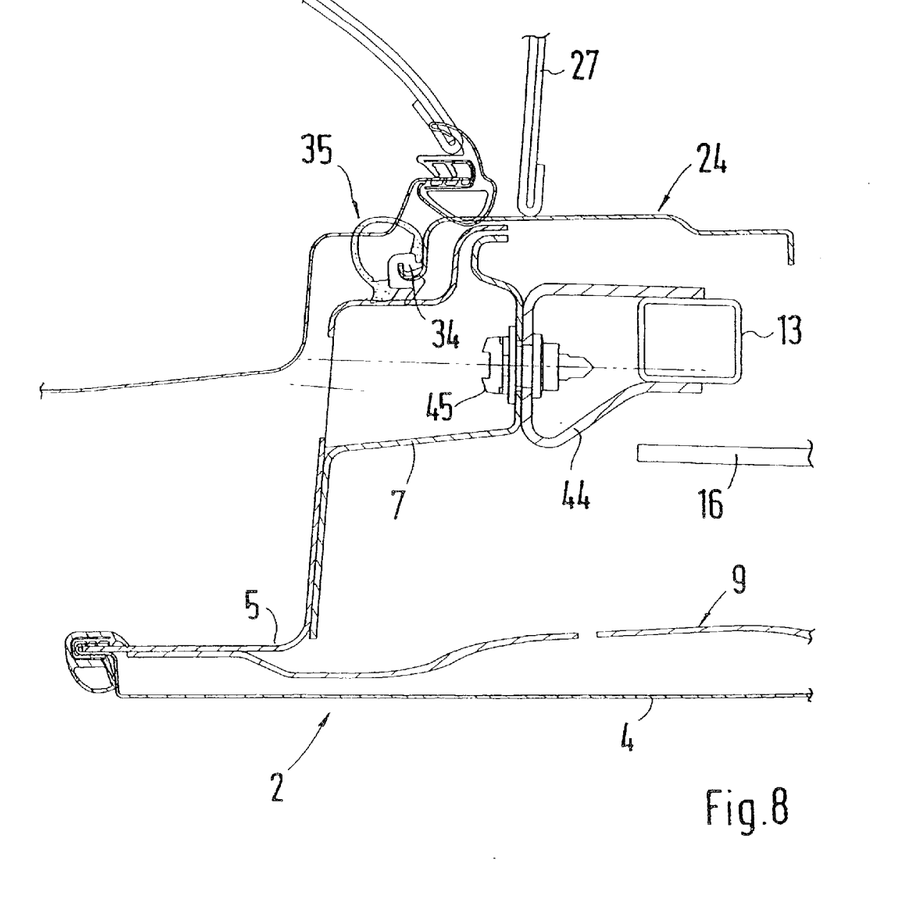
FIG. 8 a section along the line VIII—VIII of FIG. 1 in an enlarged view.
Figure 9:
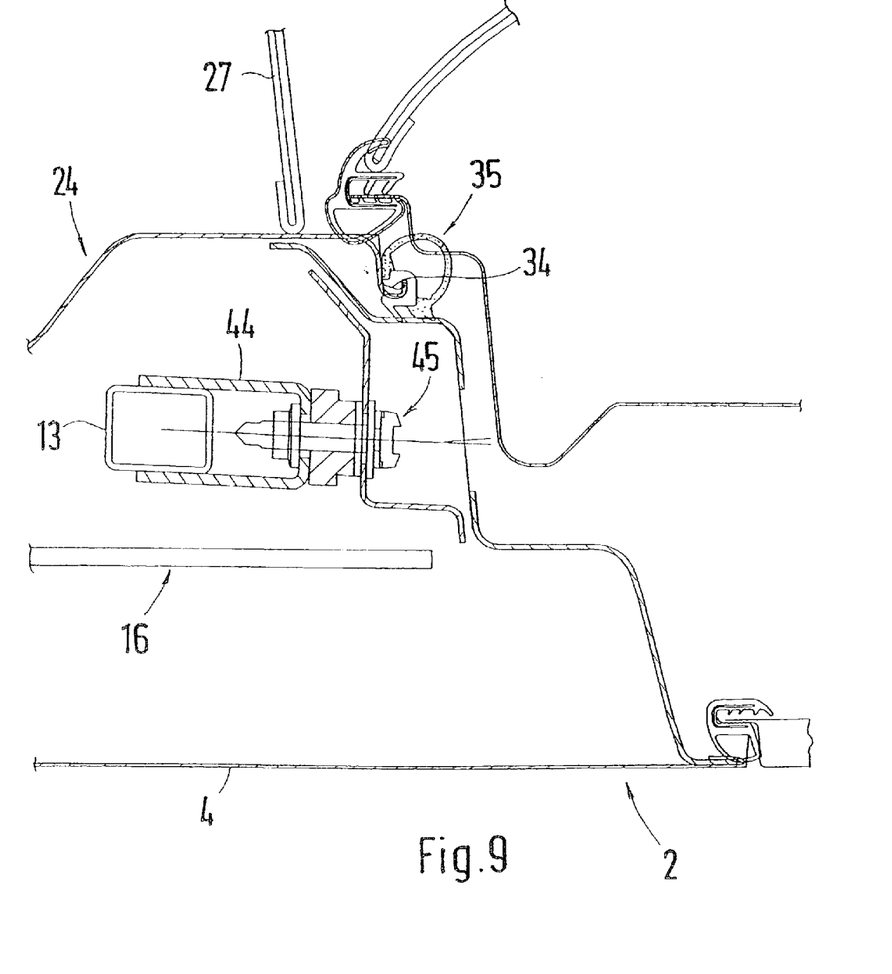
FIG. 9 a section along the line IX—IX of FIG. 1 in an enlarged view.

For attachment of the supporting doorframe 3 with the lower door element 2, two separated U-shaped consoles 44 are welded to the lower frame 13 in each of the for ward and rear upright regions of the lower frame 13 of the doorframe 3, whereby the consoles 44 each extend to the bordering lower door element 2 and are adjustably attached to the lower door element 2 via screw connections 45 (FIGS. 8 and 9).

The internal door covering 27 can be attached to the mounting support metal sheet 24 via attachment means which are not described in more detail.

In the exemplary embodiment, the motor vehicle door 1 according to the invention has an upper window frame 10 above the window sill 11 to guide the door window pane 16. This door system with a mounting support metal sheet 24 can, however, naturally also be used for a motor vehicle door which does not have a frame above the window sill 11. In this design, the upper window frame 10 is not applicable.

The foregoing disclosure has been set forth merely to it illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle door in framework construction, comprising:
a lower door element and a supporting doorframe formed of several profiled sections conjoined together, the supporting doorframe having a lower frame, at least one approximately horizontally aligned frame section at a height of a window sill, and, in a region lying below the window sill of the supporting doorframe, a large surface mounting support metal sheet accommodating functional elements, said metal sheet being attached on one side at least to the approximately horizontally aligned frame section and on another side, reaching under the lower door element or the lower door frame, to the lower door element.

2. The motor vehicle door according to claim 1, wherein an upper end region of the mounting support metal sheet is brought close to the inner side of a tailored, upward projecting flange of the horizontally aligned frame section and is attached with screws, rivets or welds.

3. The motor vehicle door according to claim 1, wherein the mounting support metal sheet, is removably attached to the lower door element except for an upper edge region of said mounting support metal sheet.

4. The motor vehicle door according to claim 1, wherein localized threaded bushings are provided on an inner edge section of the lower door element into which attachment screws for attachment of the mounting support metal sheet can be screwed.

5. The motor vehicle door according to claim 4, wherein, except for an upper horizontally aligned edge, a continuous profiled recess is formed on the mounting support metal sheet, which accommodates a main door seal below the window sill.

6. The motor vehicle door according to claim 5, wherein the main door seal above the window sill is accommodated in an upper window frame of the supporting doorframe.

7. The motor vehicle door according to claim 1, wherein the mounting support metal sheet has at least one acceptor opening for a loudspeaker.

8. The motor vehicle door according to claim 1, wherein a door lock is premounted via a support angle on the mounting support metal sheet.

9. Vehicle door according to claim 8, wherein door opening, door closing aids and a door control mechanism are attached to the mounting support metal sheet.

10. The motor vehicle door according to claim 1, wherein a window opener motor of a window opener is attached with screws on the mounting support metal sheet.

11. A motor vehicle door according to claim 1, wherein the lower door element includes an internal frame section.

12. A motor vehicle door according to claim 11, wherein the internal frame section is provided with a frame area at approximately the height of the window sill.

13. A motor vehicle door according to claim 11, wherein, in a hollow space of the lower door element, an elongated impact bar is provided adjacent and attached on both ends to the internal frame section.

14. Vehicle door in framework construction comprising:
   a lower door element,
   and a supporting door frame formed of several profiled sections conjoined together, the sections including a lower frame, at least one approximately horizontally aligned frame section in an area of a window sill, and a mounting support metal sheet with a large surface accommodating functional elements,
   wherein the mounting support metal sheet is arranged below the window sill and attached to the approximately horizontally aligned frame section and, reaching under the lower door element or the lower frame to the lower door element.

15. Vehicle door according to claim 14, wherein an upper end region of the mounting support metal sheet is brought close to inner side of a tailored, upward projecting flange of the approximate horizontally aligned frame section and is attached with screws, rivets or welds, the mounting support metal sheet, being removably attached to the lower door element except for an upper edge region of said mounting support metal sheet;
   wherein, except for an upper horizontally aligned edge, a continuous profiled recess is formed on the mounting support metal sheet, which accommodates a main door seal below the window sill;
   wherein the main door seal above the window sill is accommodated in an upper window frame of the supporting doorframe;
   wherein the mounting support metal sheet has at least one acceptor opening for a loudspeaker;
   wherein a door lock is premounted via a support angle on the mounting support metal sheet; and
   wherein a window opener motor of a window opener is attached with screws on the mounting support metal sheet.

* * * * *